US006745941B1

(12) United States Patent
Vega

(10) Patent No.: US 6,745,941 B1
(45) Date of Patent: Jun. 8, 2004

(54) ELECTRONIC KEY WITH OPTICAL SCANNER

(75) Inventor: Jose I. Vega, Corvallis, OR (US)

(73) Assignee: GE Interlogix, Inc., Salem, OR (US)

( * ) Notice: Subject to any disclaimer, the term of this patent is extended or adjusted under 35 U.S.C. 154(b) by 0 days.

(21) Appl. No.: 10/018,840

(22) PCT Filed: Jun. 21, 2000

(86) PCT No.: PCT/US00/17139

§ 371 (c)(1),
(2), (4) Date: Mar. 5, 2002

(87) PCT Pub. No.: WO00/79078

PCT Pub. Date: Dec. 28, 2000

Related U.S. Application Data

(60) Provisional application No. 60/140,317, filed on Jun. 21, 1999.

(51) Int. Cl.[7] .................................................. G06K 5/00

(52) U.S. Cl. .................. 235/382; 235/451; 235/462.45; 235/462.46; 235/472.01; 235/472.02

(58) Field of Search ................................ 235/382, 451, 235/462.45, 462.46, 472.01, 472.02

(56) References Cited

U.S. PATENT DOCUMENTS 5,204,663 A 4/1993 Lee
5,245,329 A 9/1993 Gokcebay
5,661,291 A 8/1997 Ahearn et al.
5,774,550 A * 6/1998 Brinkmeyer et al. ........ 713/168
5,832,464 A * 11/1998 Houvener et al. ............ 705/45
6,169,975 B1 * 1/2001 White et al. .................. 705/44
6,202,055 B1 * 3/2001 Houvener et al. ............ 705/44
6,321,994 B1 * 11/2001 Toth et al. .................. 235/492
6,331,812 B1 * 12/2001 Dawalibi .................... 340/5.2
6,347,743 B2 * 2/2002 Wilz et al. ............. 235/472.01
6,460,770 B1 * 10/2002 Kucharczyk ........... 235/472.02
6,483,424 B1 * 11/2002 Bianco ....................... 340/5.6
6,484,942 B1 * 11/2002 Yokoyama et al. .... 235/462.03

FOREIGN PATENT DOCUMENTS

| | | |
|---|---|---|
| CH | 673164 A | 2/1990 |
| EP | 0818725 A | 1/1998 |
| EP | 0855673 A2 | 7/1998 |
| FR | 2561949 A | 10/1985 |
| WO | WO9735442 A | 9/1997 |

* cited by examiner

*Primary Examiner*—Thien M. Le
*Assistant Examiner*—Allyson Sanders
(74) *Attorney, Agent, or Firm*—Klarquist Sparkman, LLP

(57) ABSTRACT

A key for accessing an electronic lock that also has an optical scanner includes a user interface, first and second memories and a shared data transfer circuit. The first memory serves to store access data detailing identities of locks accessed by the key. The second memory stores data scanned by the scanner. The access data and the scanned data can both be downloaded from the key via the shared data transfer circuit.

17 Claims, 7 Drawing Sheets

ELECTRONIC KEY WITH OPTICAL SCANNER

This application is a 371 of PCT/US00/17139 filed Jun. 21, 2000 and claims the benefit of Ser. No. 60/140,317 filed Jun. 21, 1999.

BACKGROUND

Security systems that provide for authorized access to a secured area through use of an electronic key are known. Various of the present assignee's patents and applications detail electronic keys useful in various site security applications.

These keys, and others, are commonly used by suppliers to make after-hours deliveries to their customers (e.g., french fries to restaurants, auto parts to car dealerships, etc.). After-hours pickups can likewise be made.

Typically, the door lock at the customer premises is electronic. The delivery driver couples the electronic key to the lock, and manipulates the key so as to unlock the lock (e.g., by entering a PIN number). The driver can then open the door and make the delivery. (In other cases, the door lock is conventional, i.e., mechanical. Such installations commonly have a small vault mounted near the door containing a mechanical door key secured on a short tether. The vault has an electronic lock and is unlocked by the driver with the electronic key. The driver can then access the mechanical key and use it to open the adjoining door.)

One advantage of such electronic keys is that they typically include a memory for logging access data (e.g., IDs of accessed locks, time of access, etc.). This data can then be downloaded into a database so as to document which driver made a delivery to which customer at which time. (Various known coupling techniques can be used to download the data from the key to a computer on which the database is maintained, e.g., infrared coupling, magnetic coupling, inductive coupling, capacitive coupling, electrical contacts coupling, etc.)

SUMMARY

The foregoing functionality is improved by integrating into the key an optical scanner so that, e.g., the delivery driver can use a common device both for access and inventory tracking. One particular type of optical scanner is a bar code reader used for reading bar code information, as is widely used today. The bar code inventory data scanned into the key is downloaded into a database—either with the access data or separately—to provide further detail about the deliveries.

DETAILED DESCRIPTION OF PREFERRED EMBODIMENTS

Figure 1:
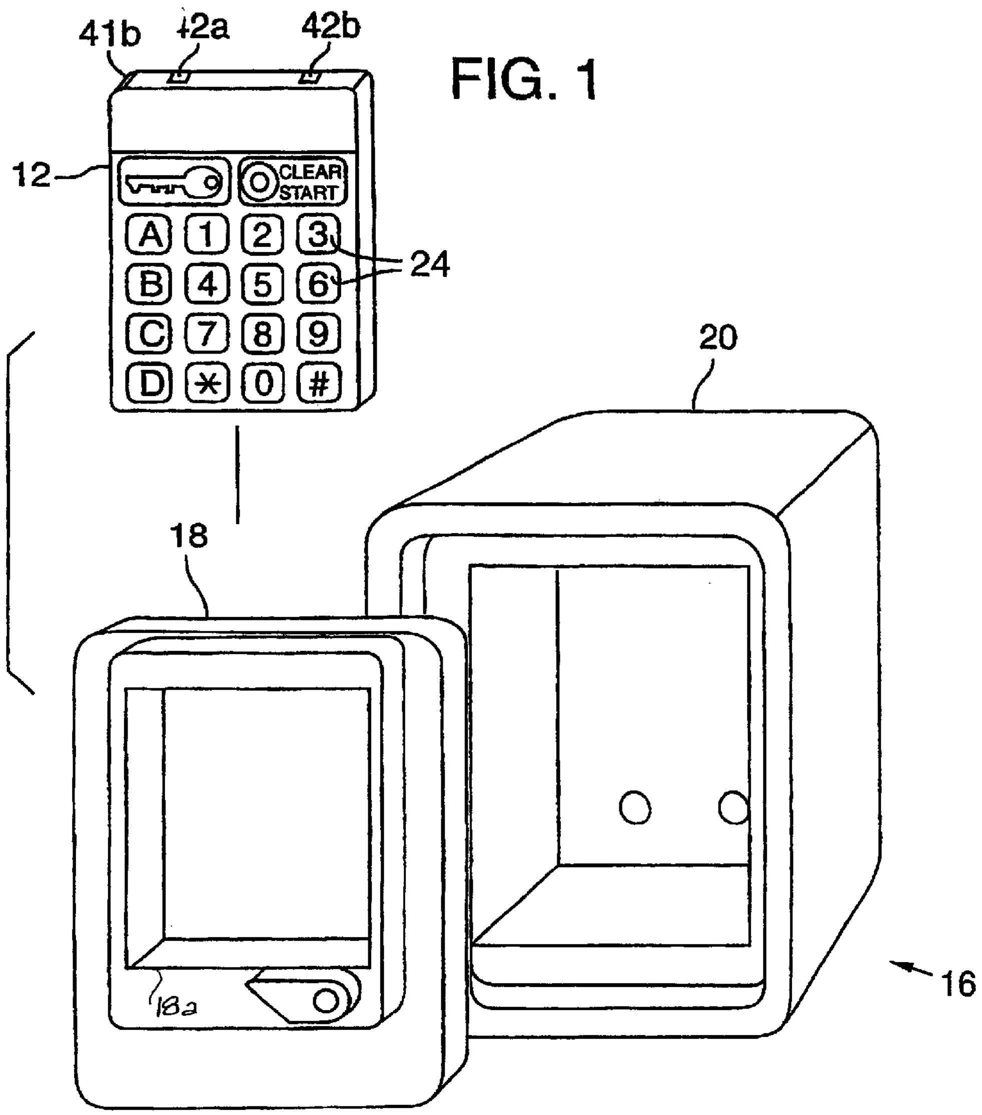
FIG. 1 is a pictorial view of an electronic key with an optical scanner shown in relation to one type of device accessed by the key.

In an exemplary embodiment, an electronic key is equipped with an optical scanning circuit that includes an optical scanning element. One such circuit, which is suited to reading optically encoded information in the form of bar codes, includes a sapphire bar code sensor tip, a bar code reader sensor, and a bar code decoding chip, all of which parts are commonly available (e.g., Hewlett-Packard part numbers HBCS-A999, HBCS-1570, and HBCR-1610, respectively).

A common memory in the key can store both the access data and the bar code inventory data, or separate memories can be provided. One particular arrangement has 4–5K of memory allocated for storage of the bar code inventory data (e.g., permitting storage of data about 1000 items, each encoded with a four byte bar code item number, accompanied by 4-byte data indicating the site(s) visited, and 4-byte data indicating the number of items).

Some electronic keys include LCD displays as a part of the key's user interface (UI). The software that implements the LCD UI can be adapted to provide user controls useful for bar code scanning operations as well. Hardware keys (themselves a form of UI) can have dual functionality, serving, e.g., to effect an unlocking operation when the key is in a first (key) mode, and to effect a scanning operation when the key is in a second (scanner) mode. Buttons presented on a UI display can likewise have dual functionality, or a UI unique to the scanning mode can be presented.

In one particular arrangement, the "Display" button on a key serves, when in bar code mode, to initiate one or more bar code reading operations. After operating the button, the user is prompted to indicate (by operation of numeric keys or otherwise) the number of packages that will be scanned. Once this number is entered, the delivery driver then scans respective bar code from each of the packages, the logging of each bar code being confirmed by an audible beep. (The key can be toggled between key and scanner modes by repeated operation of a single button.)

Just as courier services (e.g., Federal Express, UPS, etc.) employ bar code scanners to track data, time, and quantity of package deliveries, a key adapted in accordance with the present invention can be similarly used. Moreover, since the key also provides access control, data is additionally digitally logged to specify the location at which deliveries (or pick-ups) were made. (The user ID is also unambiguously indicated by key assignment and proper entry of the user's PIN code.)

If desired, a bar code identifying a facility can be mounted on or near the door through which deliveries are made (preferably inside, so as to prevent vandalism), permitting the delivery driver to optically scan that data into the device as well. (Such data would commonly be redundant of the lock ID logged with the access data, but may be desirable in certain instances.) In some applications, plural bar codes may be so-mounted, each differently encoded. These different codes can represent, for example, different actions undertaken by the delivery person, or different purposes for the visit.

From the foregoing, it will be recognized that the preferred embodiment of the present invention provides enhanced functionality for electronic keys, permitting them to perform automated inventory tracking and management at only marginally increased cost, by making dual use of the key and/or its memory, and/or the coupling means, and/or the data collection database.

It will be recognized that this technology is not limited to use by delivery drivers and for use in tracking inventory. To illustrate the diversity of applications, consider a telephone cell transmitter site. The facility is usually locked but is accessed periodically by technicians. An electronic lock can be used, just as in the delivery context detailed above. When entering or leaving the building, the technician can scan one of several bar codes positioned by the door indicating the purpose of the visit, e.g., to check the transmitter, to backup computer data, to check battery status, to check premises security, etc.

In addition, the system can be configured to record the technician's activity at the cell transmitter site. Components at the site can be bar coded, and the technician can be required to scan the bar code of each component that is accessed, inspected, adjusted, replaced, etc. In the case of a replaced component, the technician scans both the component to be replaced and the replacement component. This information can be collected to provide a profile of the components that require service or replacement most frequently, the time required to service or replace a particular component, the time spent on service operations by a particular technician, etc.

All of the data collected in the keys is for naught if it is not transferred to the database. According to one known system, if logged data is not periodically downloaded from the key, incentive data is withheld from the key user. This incentive data can be an update code that must be entered into the key every week or month to keep the key functioning. Thus, if the data is not downloaded, the key soon loses its functionality.

Further specific implementations of the electronic key with the optical scanner are described below. A first embodiment of an electronic key 12 is shown in FIG. 1.

As shown in FIG. 1, the electronic key 12 is shown in its relation to one exemplary type of secured access device, i.e., a key vault 16, with which it can be used. The vault 16 includes a body 20 and removable lid 18 and is constructed for outdoor use. As shown, lid 18 has a recess 18*a* within which key 12 is inserted to make electrical contact between key 12 and a lock mechanism in the key vault 16.

The key 12 interfaces with other secured access devices, such as an electronic door lock, similarly. In addition, and as described in greater detail below, key 12 may communicate by infrared transmission in addition to or instead of direct electrical contact.

Figure 2:
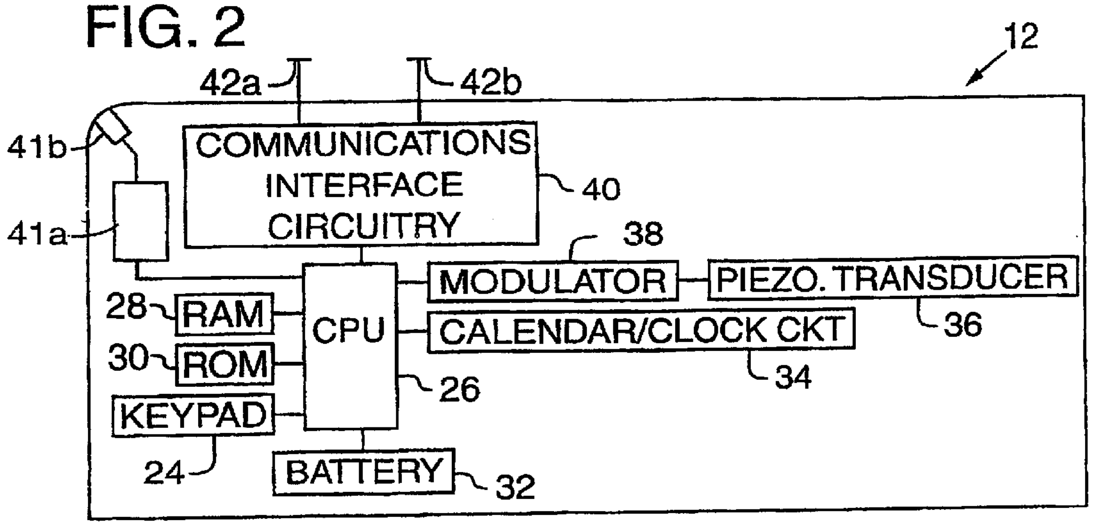
FIG. 2 is a schematic block diagram of an electronic key.

As shown in FIG. 2, key 12 has a case 13 with a keypad 24. The case 13 houses a CPU 26, RAM and ROM memories 28, 30, a battery 32, a calendar/clock circuit 34, a piezoelectric transducer 36 with associated modulator 38, a communications interface 40 and an optical scanning circuit 41*a*.

As illustrated in FIG. 1, the case 13 may be constructed as a trim polycarbonate enclosure sized to fit conveniently in a user's pocket. An optical scanning element 41*b* is positioned at the surface of the case 13 as shown in an upper left-hand corner of the key 12. Alternatively, the optical scanning element 41*b* can be positioned at other locations, provided that (1) the key 12 can be conveniently held while executing a bar code reading operation and (2) the overall shape of the key 12 remains generally unchanged (such that the key 12 can still interface with secure access devices (such as the vault 16).

Figure 3:
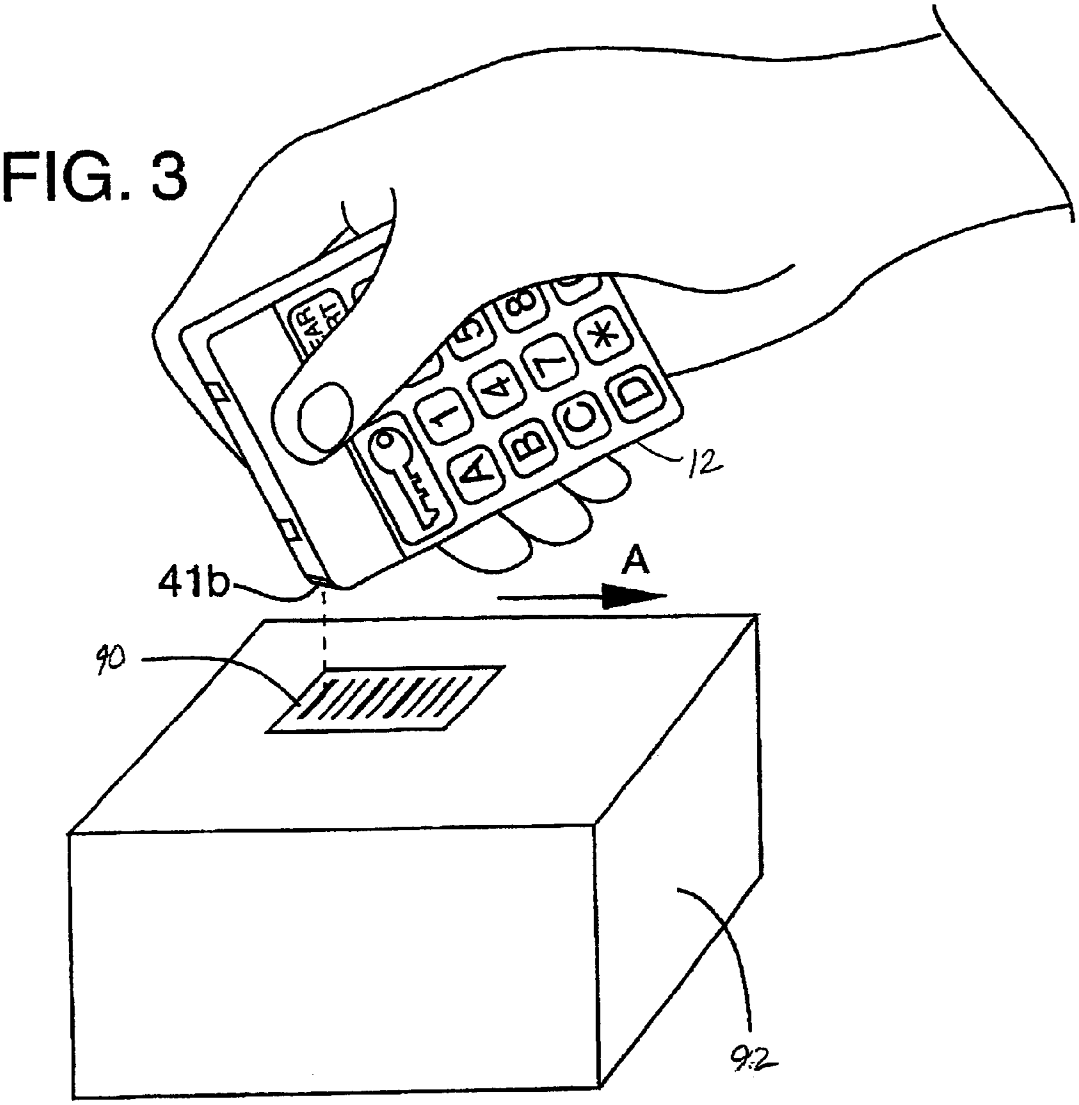
FIG. 3 is a pictorial view showing the key of FIG. 1 being used to scan optically encoded information on an object.

As shown in FIG. 1 (and schematically in FIG. 2), the upper left-hand corner of the enclosure is slightly rounded to facilitate moving the key 12 across a surface having a bar code with the optical scanning element 41*b* being maintained in contact with or within a specified distance from the bar code. FIG. 3 shows a user holding the key 12 and moving it in a direction A across a bar code 90 on an object 92. The operative distance at which the key 12 can read the bar code 90 depends upon the particular type of scanning element 41*b* used, and may range from approximately in contact with the object 92 to approximately one foot or more from the object.

In the illustrated implementation, the optical scanning element 41*b* includes a sapphire tip. As is known to those of ordinary skill in the art, other equivalent structures can be substituted for the sapphire tip. For example, depending upon the particular application, the optical scanning element 41*b* can use CCD or active laser technology, as just two examples. Active laser technology usually allows a greater operative scanning range, but has greater power requirements.

The illustrated communications interface employs two electrical contacts 42*a*, 42*b* exposed on top of the key 12, but other coupling arrangements (e.g. more than two contacts, inductive coupling, optoelectronic coupling, etc.) can alternatively be used. In other embodiments, key 12 can include a small alphanumeric display (e.g., LCD) and/or one or more indicator lights (e.g., LEDs).

Contacts 42*a*, 42*b* connect to corresponding elements on the vault lid 18 (not shown), as described below. The communications interface 40 bidirectionally couples data signals between the key 12 and lid 18 in the form of modulation on a power signal provided from the electronic key 12 to lid 18. Key 12 can serve not only as an access key for the vault 16, but also as a data link—relaying data to and from the vault 16.

CPU 26 can be an Intel microcomputer (e.g. 80C52) that controls operation of the key according to programming instructions permanently stored in ROM 30. The calendar/clock circuit 34 provides data corresponding to the year, month, day, and time.

The illustrated RAM 28 is comprised of a small RAM memory inside the calendar/clock circuit 34, together with 2 EEPROMS, the latter of which can store 2048 (2K) 8-bit bytes of data.

Transducer 36 is used to provide audible feedback to the user signaling a variety of key conditions. The transducer can also be used for frequency shift keyed relaying of data from the key to external devices (e.g. through an audio telephone circuit).

Battery 32 can comprise three AAA cells which provide power to the key circuitry and, through contacting elements 42, to vault lid 18 as well.

Figure 4:
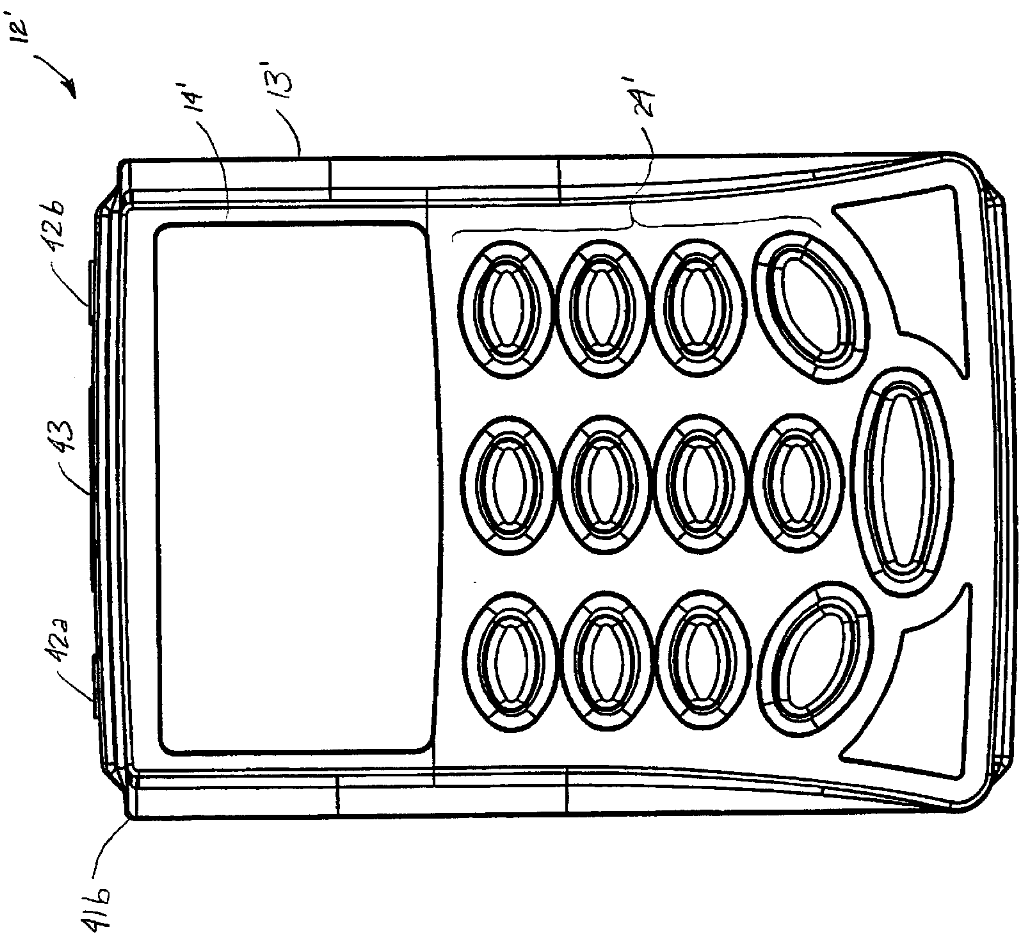
FIGS. 4, 5 and 6 are front, right side and pictorial views, respectively, of a key with an optical scanner according to a second embodiment.
Figure 5:
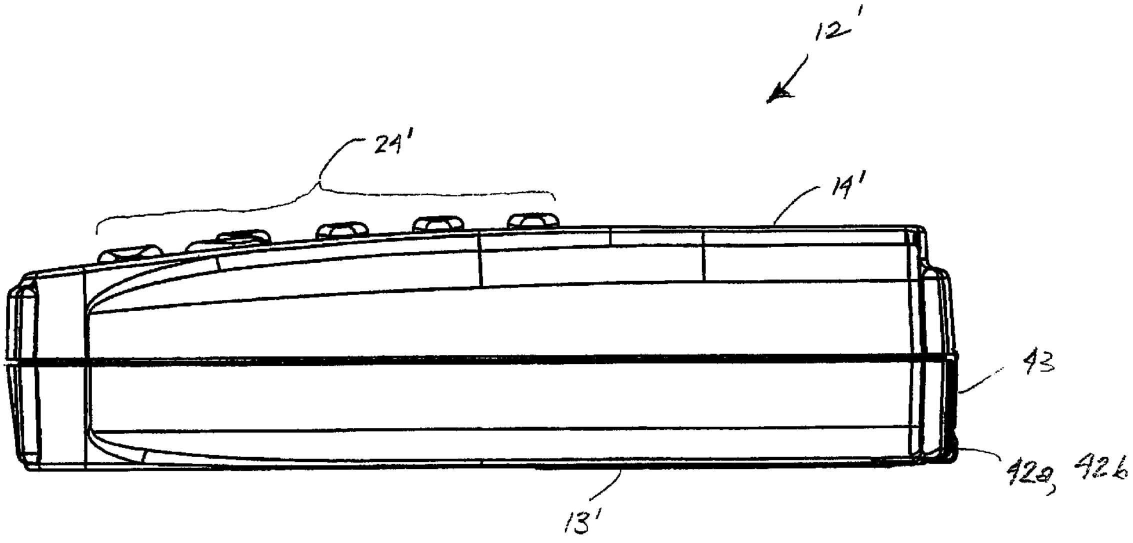
Figure 6:
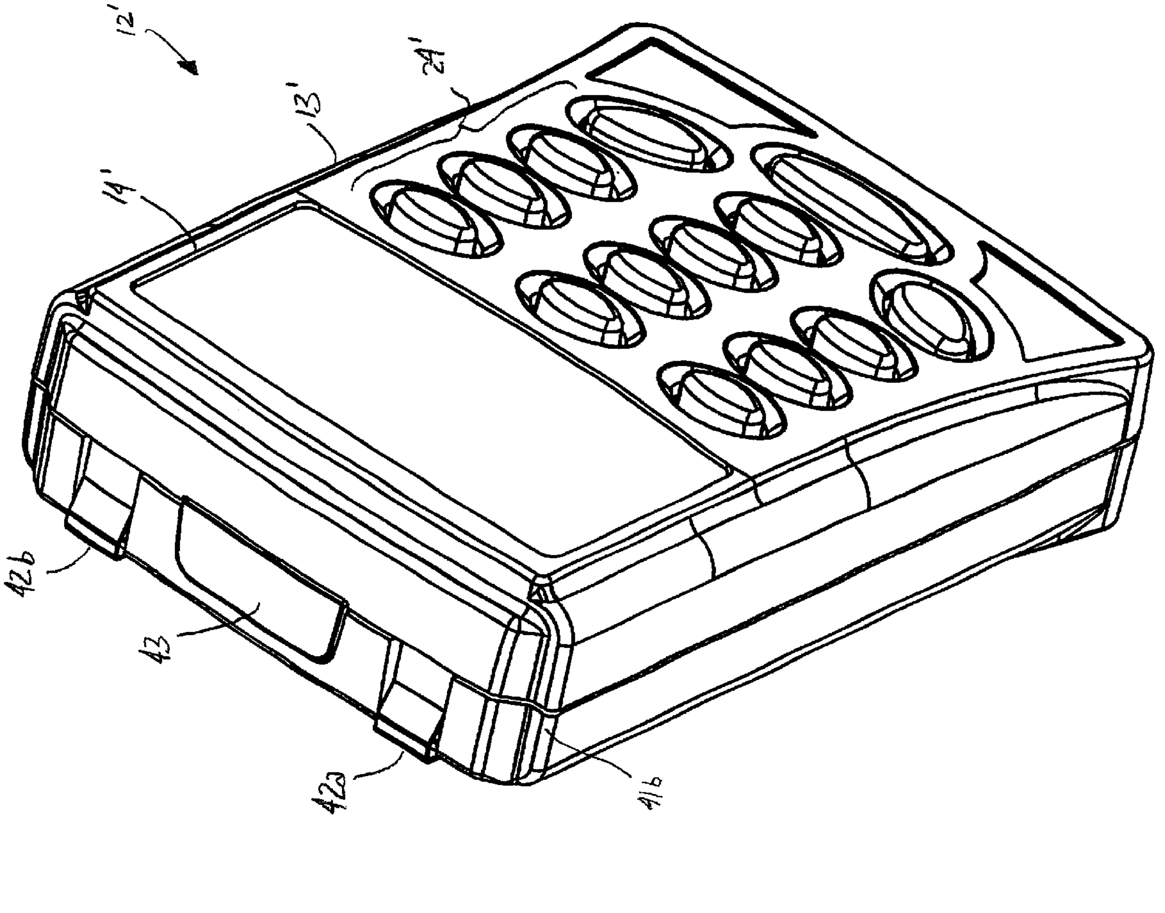

FIGS. 4–6 show an electronic key 12' according to a second embodiment. The key 12' is similar to the key 12, except that the case 13', display 14' and key pad 24' are shaped differently, and the key 12' includes an infrared transmitter or transceiver 43 that allow the key to communicate with secured access devices and to transfer data optoelectronically. In the key 12', the infrared transceiver 43 is positioned on the case 13' between the contacts 42*a*, 42*b*. In the block diagram of FIG. 2, the infrared transceiver 43 is embodied as part of the communications interface circuitry 40.

Figure 7:
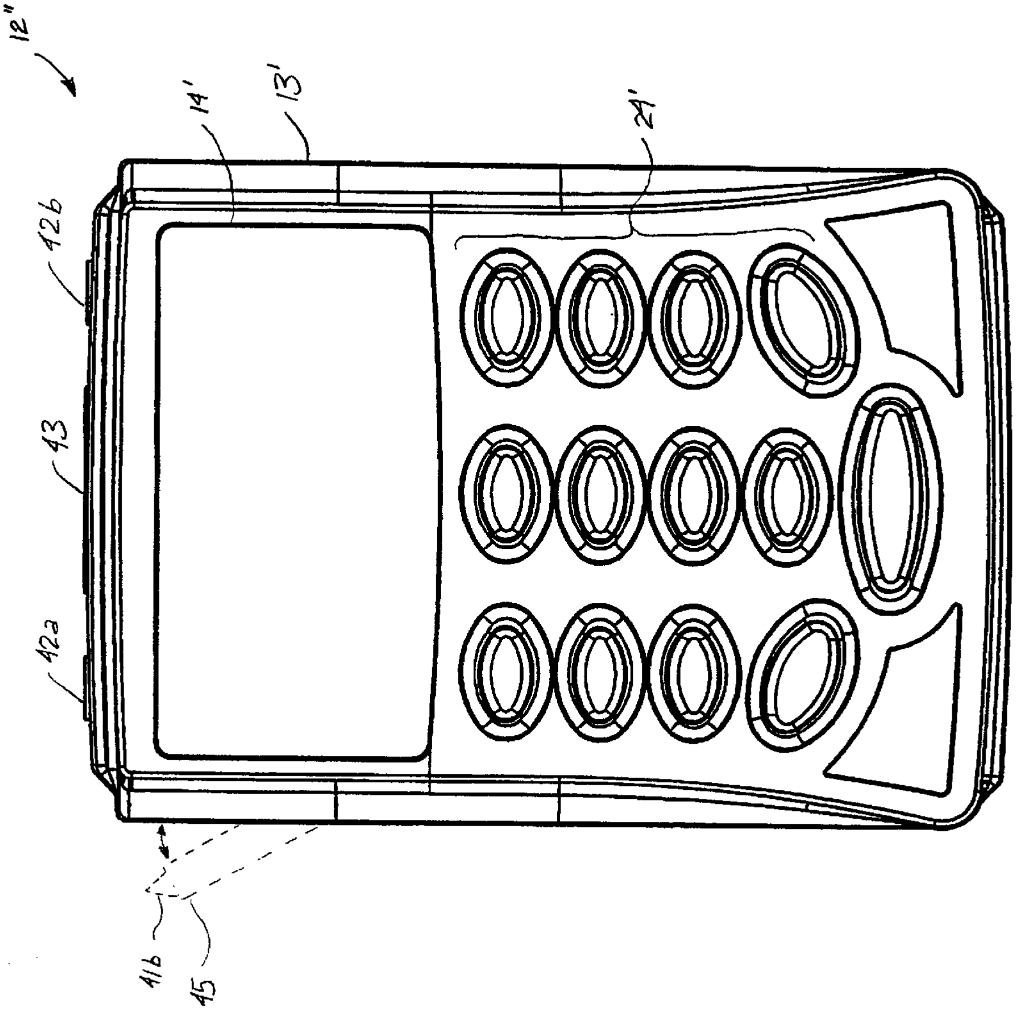
FIG. 7 is a front view of a key with an optical scanner according to a third embodiment, showing the optical scanner pivoted outwardly from the case in its operating position.

FIG. 7 shows an electronic key 12" according to a third embodiment. The key 12" is similar to the key 12', but in the key 12", the bar code scanning element 41*b* is attached to a pivoting member 45. The pivoting member 45 is attached to a side of the case 13 such that it can be pivoted outwardly to its operative position as shown in FIG. 7 or pivoted inwardly to its closed position within the outline of the case 13. The pivoting member 45 allows for scanning in some applications where clearances or interference might make use of the key 12 or the key 12' difficult.

Figure 8:
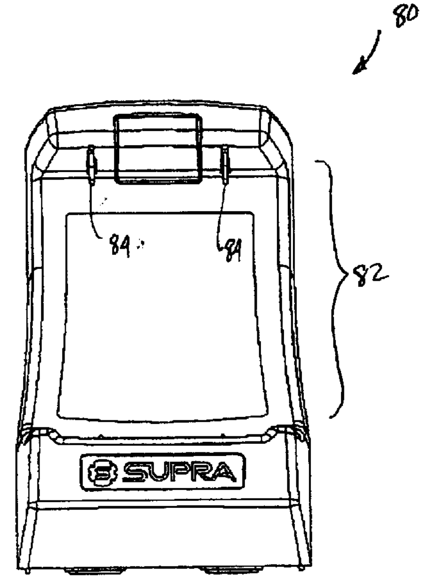
FIGS. 8, 9 and 10 are front, right side and pictorial views, respectively, of a stand shaped to receive the key of FIGS. 4, 5 and 6 or FIG. 7.
Figure 9:
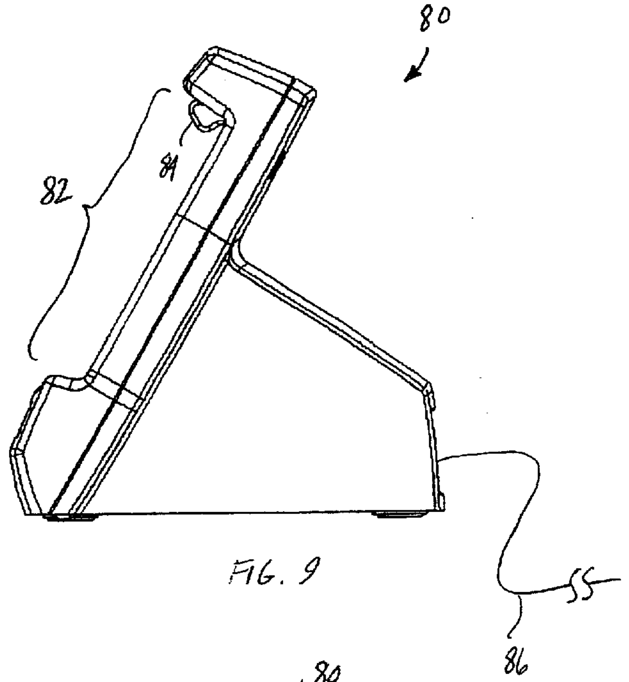
Figure 10:
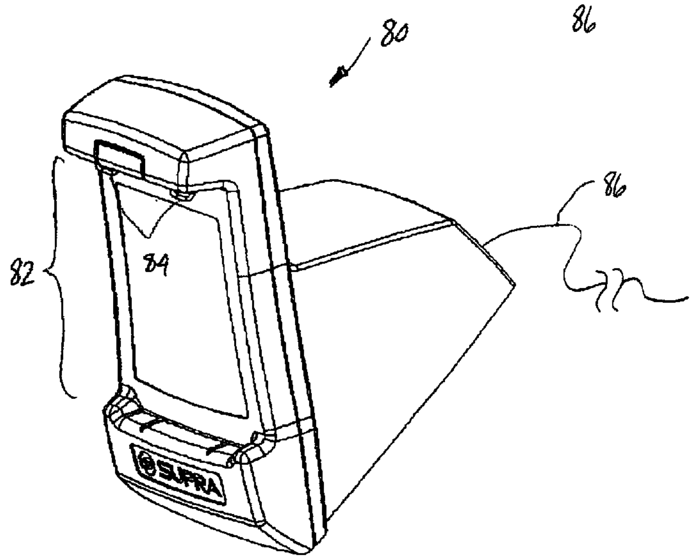

A suitable stand 80 shaped to receive the key 12' (or the key 12") is shown in FIGS. 8–10. The stand 80 has a key receiving portion 82, contacts 84*a*, 84*b* (corresponding to the contacts 42*a*, 42*b*, respectively) and a telephone line connection 86 to a computer (not shown). The stand is used to download access and scanned data from the key (via the contacts 42*a*, 42*b* and the contacts 84*a*, 84*b*) over the connection 86 to the computer. The stand 80 can be configured to begin the downloading process automatically, i.e., without requiring the user to intervene (e.g., by pressing a button or similar operation), when the key 12' is received in the stand 80.

Optionally, the connection 86 and the stand 80 can be used to upload information to the key 12'. One type of such information is programming updates to the key 12' functions. The stand can also be connected to a suitable power source and fitted with an appropriate AC/DC converter to recharge the battery 35, if desired.

The keys 12, 12' and 12" as described above are dedicated devices, i.e., they function as secured access devices and optical scanners. However, it is also possible to embody all of the key and scanner functionality together in other handheld appliances, such as personal digital assistants and cellular telephones.

Having described the principles of my invention with reference to illustrative embodiments and certain variations thereon, it will be recognized that the invention is not so limited but can be modified in arrangement and detail without departing from such principles. Accordingly, I claim as my invention all such modifications as may fall within the scope and spirit of the following claims, and equivalents thereto.

I claim:

1. An electronic key for accessing an electronic lock, the key comprising:

a key case sized for holding in one hand;

an optical scanner coupled to the key case and storable within the key case, the optical scanner comprising an optical scanning element connected to an optical scanning circuit, a user interface on the exterior of the key case that can receive user input for accessing locks and performing scanning operations; and a circuit housed within the key case and being connected to the user interface and the optical scanner, the circuit comprising:

a first memory serving to store access data detailing identities of locks accessed by the key, a second memory serving to store data scanned by the optical scanner, and a shared data transfer circuit by which both the access data and the scanned data can be downloaded from the keys, wherein the key allows for single-handed scanning of optically readable media.

2. The key of claim 1, wherein the first and second memories comprise different storage elements within a shared memory circuit.

3. The key of claim 1, wherein the shared data transfer circuit includes an infrared port through which data can be transmitted.

4. The key of claim 1, wherein the shared data transfer circuit includes at least one contact on the key through which data can be transmitted from and received by the key when the key is connected by the contact to another device.

5. The key of claim 1, wherein the user interface includes a keypad.

6. The key of claim 1, wherein the user interface includes a display screen.

7. The key of claim 1, wherein the optical scanner is a bar code reader configured to read bar codes.

8. The key of claim 1, wherein the optical scanning element is positioned within the case adjacent a side thereof.

9. The key of claim 8, wherein the case has the form of a generally rectangular solid, and wherein the optical scanning element is positioned adjacent a corner thereof.

10. The key of claim 1, wherein the case includes a pivoting element, and wherein the optical scanning element is attached to the pivoting element, and the pivoting element being positionable in at least a first operative position pivoted outward from the case and a second storage position pivoted within the case.

11. The key of claim 1, wherein the case has a scanner storage portion sized to receive the optical scanner.

12. The key of claim 1, wherein the circuit further comprises a processor for carrying out access instructions relating to access of a secured area;

scanning instructions relating to scanning of optically encoded information;

storing instructions relating to storing access data detailing identities of locks accessed by the key in the first memory;

storing instructions relating to storing data scanned by the optical scanner; and downloading instructions relating to the downloading of both the access data and the scanned data from the key.

13. A key for accessing an electronic lock, the key including a user interface and a memory, the memory serving to store access data detailing identities of locks accessed by the key, the key further including a button that is operable to switch the key from an access mode to an optical scanning mode.

14. The key of claim 13 in which the user interface includes at least one button whose functionality is changed by switching the key form the access mode to the optical scanning mode.

15. A method of using a hybrid electronic key and optical scanner device, comprising:

using the hybrid device to gain access to a locked door at a site;

logging access data within the hybrid device, the access data indicating the identity of the site;

delivering one or more articles to the site;

scanning optical data on the articles using the hybrid device;

logging the scanned optical data within the hybrid device; and later downloading both the access data and the scanned optical data from the hybrid device to at least one database.

16. An access and scanning system, comprising:

an electronic key for accessing an electronic lock, the key comprising:

a key case sized for holding in one hand, a optical scanner coupled to the key case and storable within the key case, the optical scanner comprising an optical scanning element connected to an optical scanning circuit, a user interface on the exterior of the key case that can receive user input for accessing locks and performing scanning operations. and a circuit housed within the key case and being connected to the user interface and the optical scanner, the circuit comprising:

a first memory serving to store access data detailing identities of locks accessed by the key, a second memory serving to store data scanned by the optical scanner, and a shared data transfer circuit by which both the access data and the scanned data can be downloaded from the key, wherein the key allows for single-handed scanning of optically readable media; and a stand having a receiving portion within which the electronic key is engageable that makes an electrical connection with the data transfer circuit of the electronic key, the stand having a link to a remote computer over which data can be exchanged between the key and the remote computer, wherein when the key is engaged within the stand, the stored data in the key can be automatically uploaded to the remote computer over the link.

17. A general purpose personal digital assistant (PDA) programmed to additionally function as an electronic key for accessing an electronic lock, further comprising:

an optical scanner element and an associated optical scanner circuit interconnected with a PDA circuit, the optical scanner circuit having a separate memory, the optical scanner element being positionable in a first storage position within the PDA and a second operating position coupled to the PDA for reading optically encoded information and storing the read information in the separate memory.

* * * * *

UNITED STATES PATENT AND TRADEMARK OFFICE

CERTIFICATE OF CORRECTION

PATENT NO. : 6,745,941 B1
DATED : June 8, 2004
INVENTOR(S) : Jose I. Vega

It is certified that error appears in the above-identified patent and that said Letters Patent is hereby corrected as shown below:

Title page,
Item [56], References Cited, U.S. PATENT DOCUMENTS, insert
-- 6,471,225 B1 * 10/2002 Luh ............... 280/124.106 --.

Signed and Sealed this

Twenty-sixth Day of April, 2005

JON W. DUDAS
*Director of the United States Patent and Trademark Office*